US009829939B1

(12) United States Patent
Lien et al.

(10) Patent No.: US 9,829,939 B1
(45) Date of Patent: Nov. 28, 2017

(54) HARD DISK MOUNTING DEVICE

(71) Applicant: HON HAI PRECISION INDUSTRY CO., LTD., New Taipei (TW)

(72) Inventors: Yen-Chih Lien, New Taipei (TW); Tsang-Sen Lai, New Taipei (TW); Cheng-Hua Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/186,707

(22) Filed: Jun. 20, 2016

(30) Foreign Application Priority Data

May 26, 2016 (CN) .......................... 2016 1 0358467

(51) Int. Cl.
*G06F 1/18* (2006.01)
*G11B 33/02* (2006.01)

(52) U.S. Cl.
CPC ............ *G06F 1/187* (2013.01); *G11B 33/022* (2013.01)

(58) Field of Classification Search
None
See application file for complete search history.

(56) References Cited

U.S. PATENT DOCUMENTS

| 6,587,350 | B1 * | 7/2003 | Lin | H05K 7/1411 361/754 |
| 6,840,801 | B1 * | 1/2005 | Behl | G06F 1/183 439/541.5 |
| 6,950,313 | B1 * | 9/2005 | Shih | H05K 7/1408 361/679.31 |
| 7,057,902 | B2 * | 6/2006 | Li | G06F 1/184 361/759 |
| 8,081,480 | B2 * | 12/2011 | Tsai | G06F 1/185 361/732 |
| 8,259,441 | B2 * | 9/2012 | Chuang | G06F 1/187 361/679.31 |
| 8,622,646 | B2 * | 1/2014 | Quan | H05K 5/0239 361/679.39 |
| 2003/0107878 | A1 * | 6/2003 | Kaminski | G06F 1/184 361/759 |
| 2008/0089124 | A1 * | 4/2008 | Nguyen | G11B 33/121 365/185.04 |
| 2009/0212182 | A1 * | 8/2009 | Ding | G06F 1/187 248/225.11 |
| 2010/0208423 | A1 * | 8/2010 | Lai | G11B 33/124 361/679.38 |
| 2011/0013352 | A1 * | 1/2011 | Chuang | G06F 1/187 361/679.31 |
| 2011/0032670 | A1 * | 2/2011 | Tsai | H05K 5/0295 361/679.31 |

(Continued)

*Primary Examiner* — Xanthia C Cunningham
(74) *Attorney, Agent, or Firm* — Steven Reiss

(57) ABSTRACT

A device for mounting a hard disk in a server or other housing includes a frame, a hard disk, and a rotatable element. The frame defines a receiving space thereon and includes an end wall. The hard disk is slidably received in the receiving space. The hard disk includes a fastening element facing to the end wall. The hard disk is slidably attached to the end wall and the fastening element is locked to the end wall. The rotatable element is attached to the end wall and can rotate from a first position to a second position to abut the fastening element. The rotatable element can be pressed against the fastening element to unlock and the hard disk can be slidably detached from the end wall.

18 Claims, 5 Drawing Sheets

(56) References Cited

U.S. PATENT DOCUMENTS

| | | | |
|---|---|---|---|
| 2012/0134092 A1* | 5/2012 | Terwilliger | G06F 1/187 361/679.33 |
| 2013/0135815 A1* | 5/2013 | Zhou | G06F 1/187 361/679.33 |
| 2014/0112712 A1* | 4/2014 | Hou | G06F 1/187 403/316 |
| 2015/0288098 A1* | 10/2015 | Kuo | H01R 13/62977 439/343 |
| 2016/0309608 A1* | 10/2016 | Wang | G06F 1/187 |

* cited by examiner

HARD DISK MOUNTING DEVICE

CROSS-REFERENCE TO RELATED APPLICATIONS

This application claims priority to Chinese Patent Application No. 201610358467.2, filed on May 26, 2016, the contents of which are incorporated by reference herein.

FIELD

The subject matter herein generally relates to computer construction.

BACKGROUND

Servers include a frame and at least one hard disk mounted to the frame. The hard disk is mounted to the frame by screws. When assembling and disassembling the hard disk, a tool is needed.

BRIEF DESCRIPTION OF THE DRAWINGS

Implementations of the present technology will now be described, by way of example only, with reference to the attached figures.

DETAILED DESCRIPTION

Figure 1:
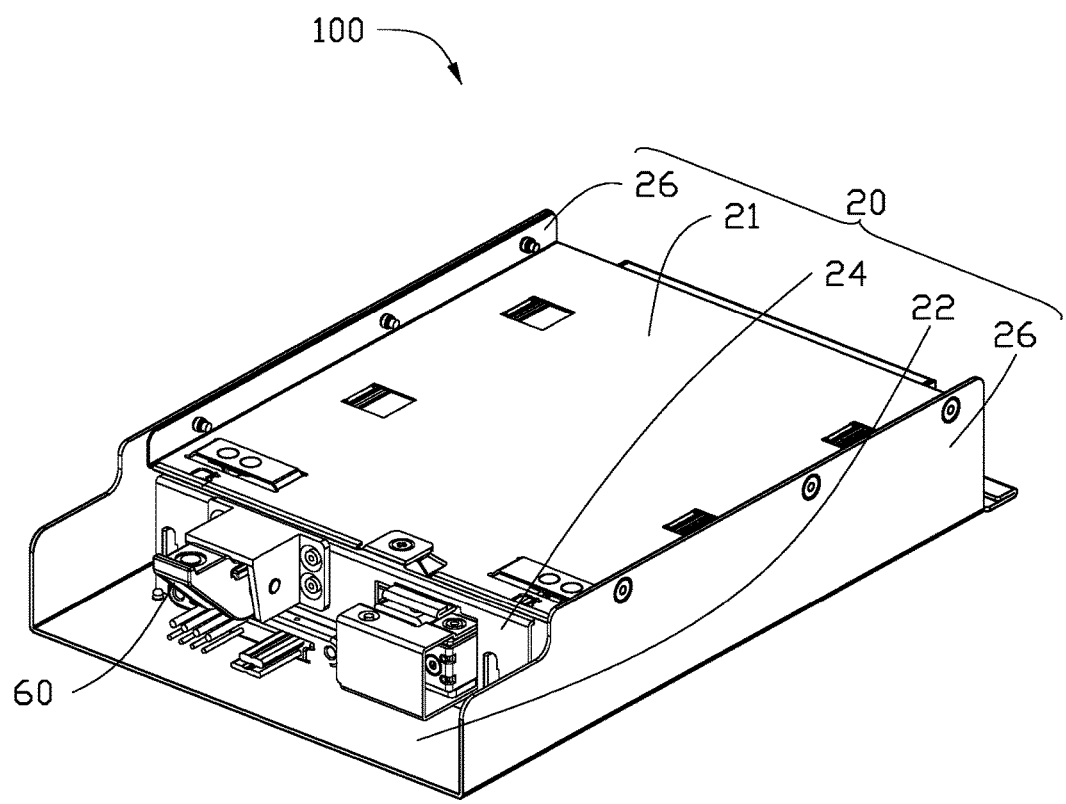
FIG. 1 is an isometric view of a mounting device for a hard disk.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to"; it specifically indicates open-ended inclusion or membership in a so-described combination, group, series, and the like.

Figure 2:
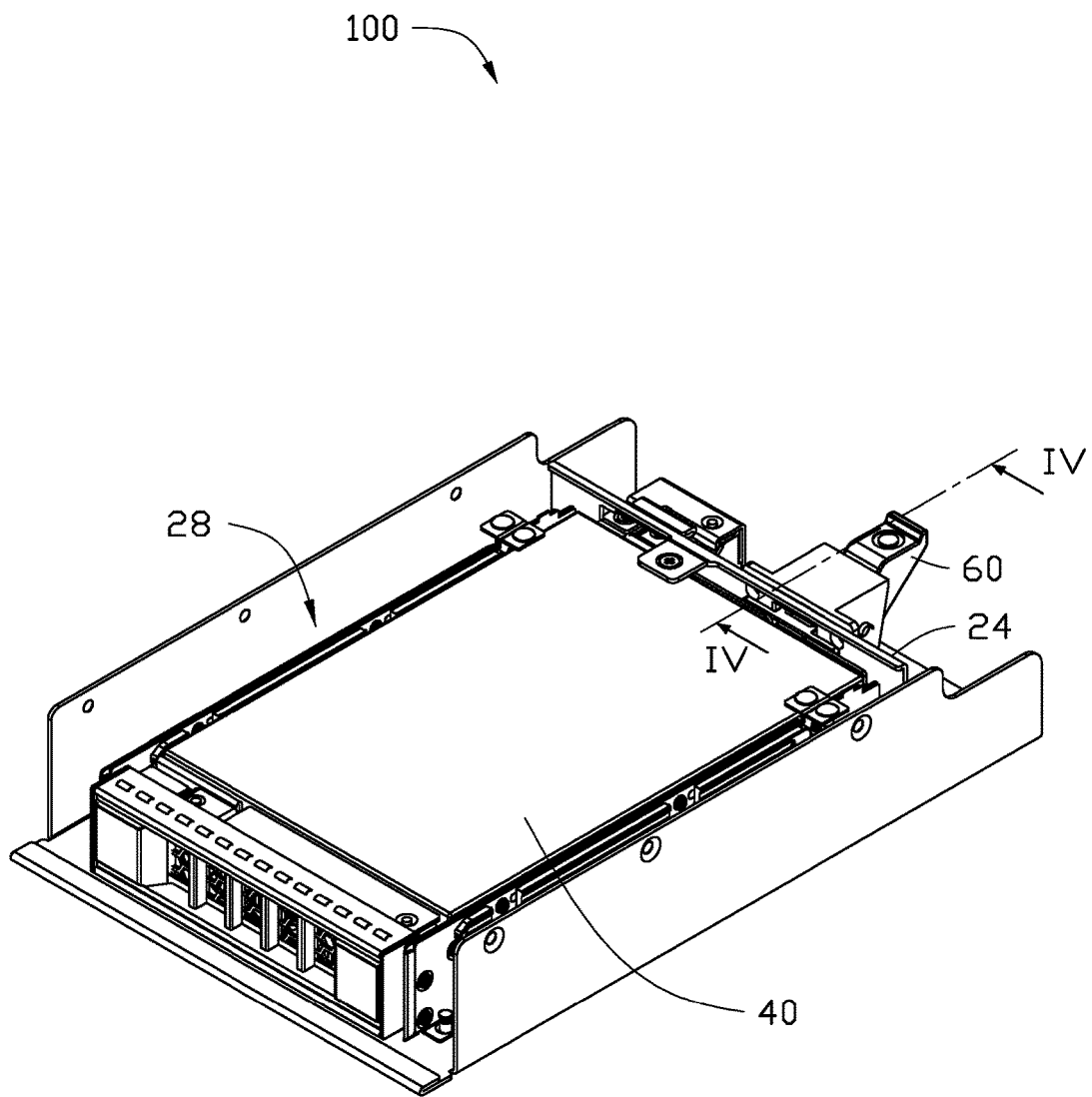
FIG. 2 is similar to FIG. 1, with a top wall omitted.

FIGS. 1 and 2 illustrate a hard disk mounting device 100 for having a hard disk 40 mounted thereto. The hard disk mounting device 100 includes a frame 20 and a rotatable element 60. The hard disk 40 is detachably connected to the frame 20. The rotatable element 60 is rotatably attached to the frame 20. The rotatable element 60 is configured to be pressed such that the hard disk 20 can be disassembled from the frame 20.

The frame 20 includes a top wall 21, a bottom wall 22, an end wall 24, and two sidewalls 26. The top wall 21 is parallel to the bottom wall 22. The end wall 24 and the two the sidewalls 26 are perpendicularly arranged between the top wall 21 and the bottom wall 22. The two sidewalls 26 are parallel to each other. The end wall 24 is perpendicularly positioned between the two sidewalls 26. The top wall 21, bottom sidewall 22, the end wall 24, and the two sidewalls 26 define a receiving space 28. The hard disk 40 is received in the receiving space 28 and is slidable along the sidewalls 26.

Figure 3:
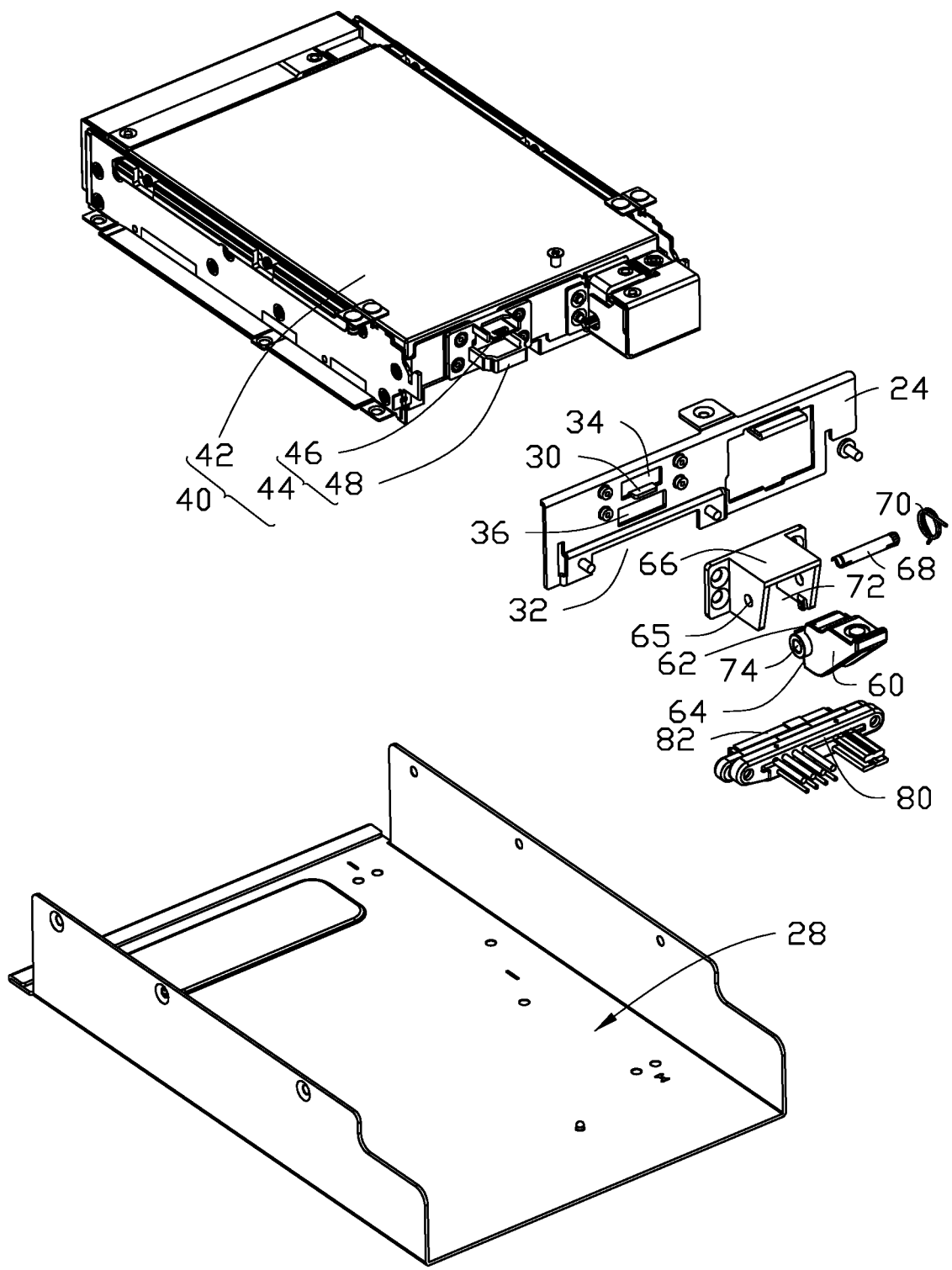
FIG. 3 is an exploded view of the mounting device shown in FIG. 2.
Figure 4:
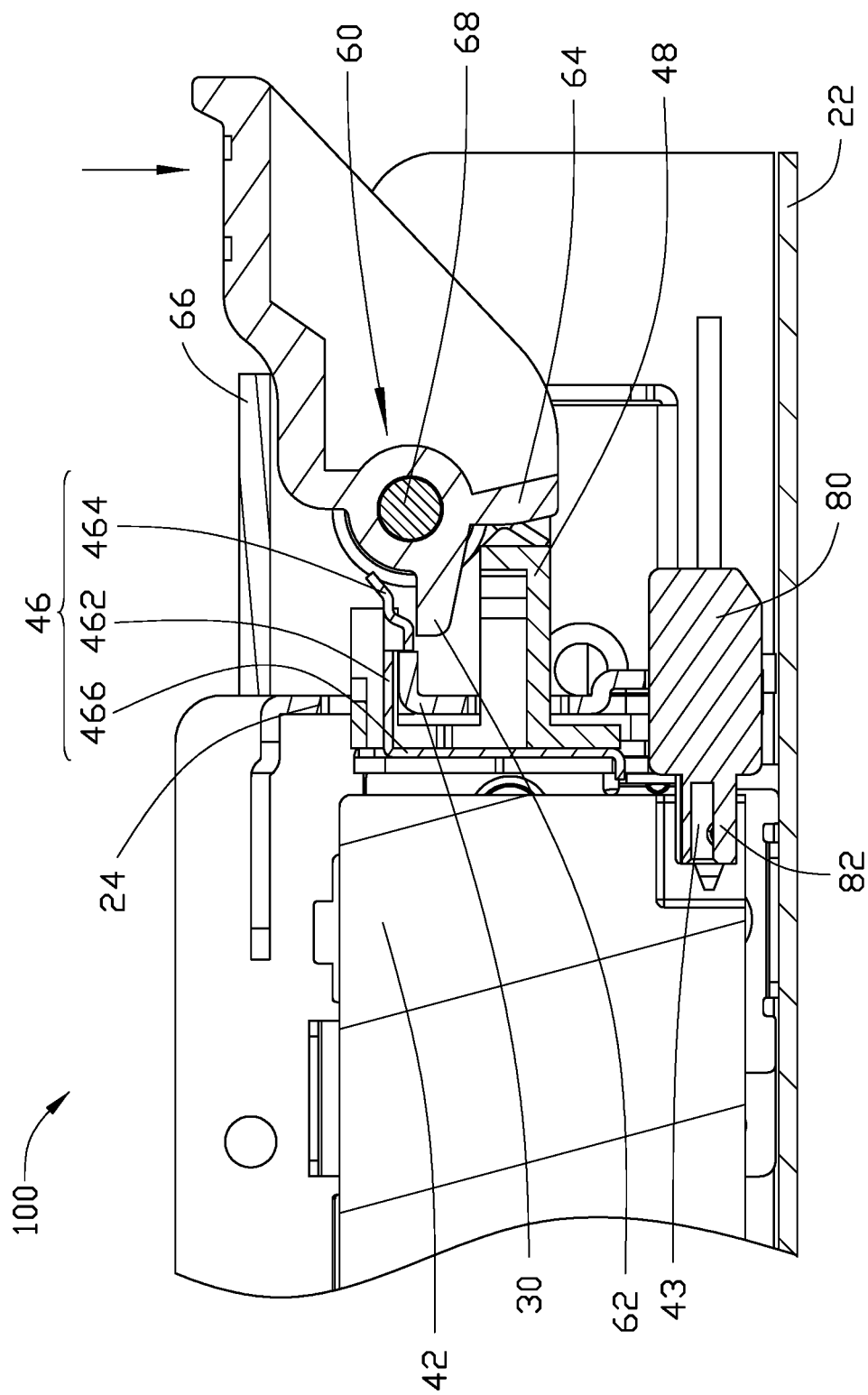
FIG. 4 is a cross-sectional view taken along the line IV-IV of FIG. 2.
Figure 5:
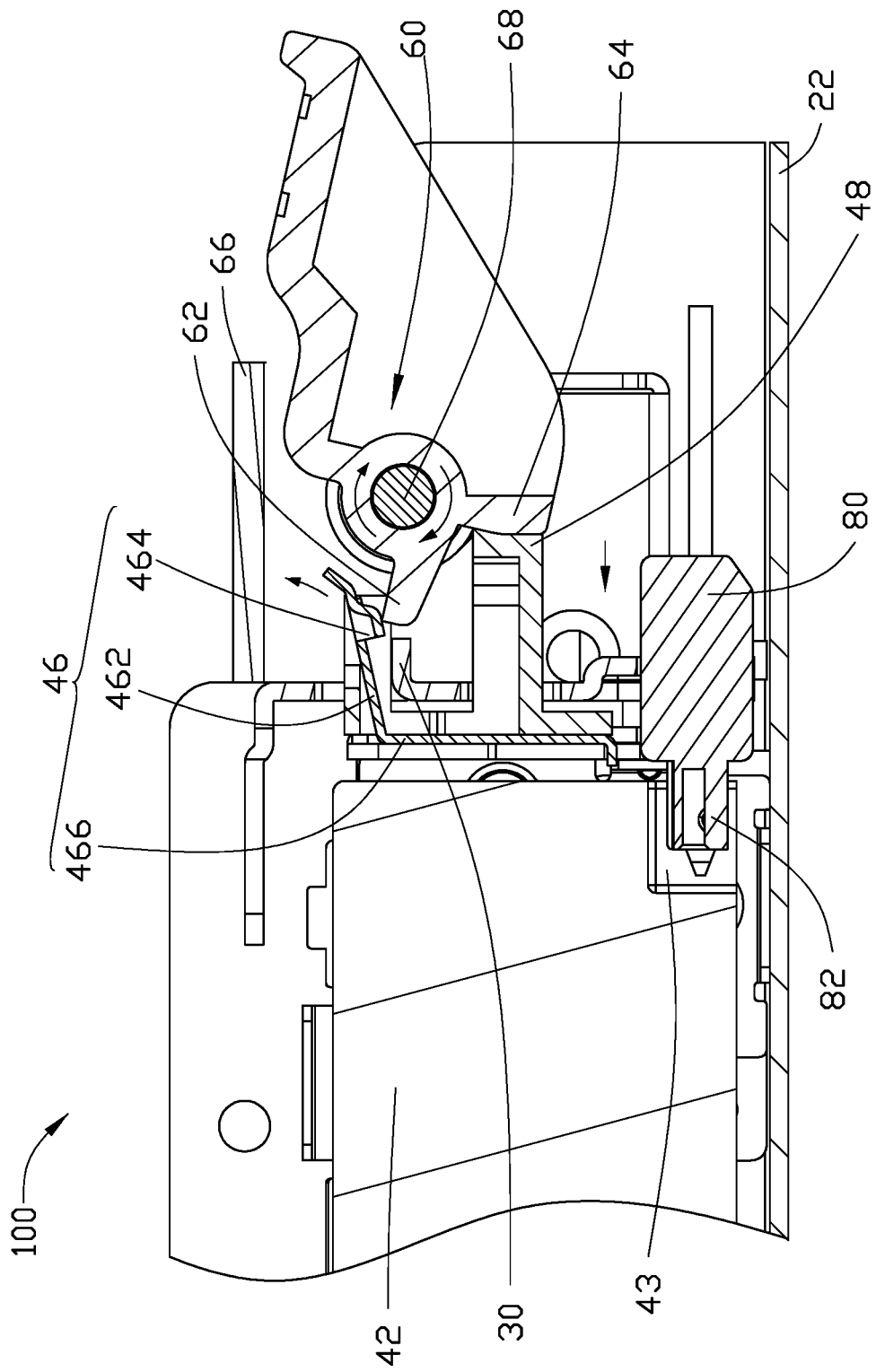
FIG. 5 is similar to FIG. 4, but with a rotatable element pressing against a fastening element.

The hard disk 40 includes a main body 42 and a fastening element 44 mounted to an end of the main body 42. The fastening element 44 faces the end wall 24. FIGS. 3 to 5 illustrate that the hard disk 40 can be slided toward the end wall 24 and the fastening element 44 can lock onto the end wall 24. The rotatable element 60 is attached to the end wall 24. In FIGS. 4 and 5, when an external force is exerted on the rotatable element 60, the rotatable element 60 can rotate to a preset position to press against and unlock the fastening element 44, and the hard disk 40 be slided away from the end wall 24.

The fastening element 44 includes an elastic buckle 46 and a pressing element 48. The end wall 24 includes a locking portion 30. The elastic buckle 46 is locked to the locking portion 30 such that the hard disk 4 is mounted to the frame 20. The rotatable element 60 includes a first rotatable portion 62 and a second rotatable portion 64. When the elastic buckle 46 is locked to the locking portion 30, the first rotatable portion 62 is positioned below the elastic buckle 46. The first rotatable portion 62 is rotated to abut against the elastic buckle 46 and subsequently deform the elastic buckle 46 to unlock from the locking portion 30. The second rotatable portion 64 rotatably follows the first portion 62. When the elastic buckle 46 unlocks from the locking portion 30, the second portion 64 presses against the pressing element 48 and the hard disk 40 can be slided away from the end wall 24.

The elastic buckle 46 includes a base plate 462 parallel to the bottom wall 22 and a protrusion 464 protruding from a side of the base plate 462 toward the bottom wall 22. The end wall 24 defines a first through hole 34 thereon. The locking portion 30 perpendicularly extends from a side of the end wall 24 away from the hard disk 40. The locking portion 30 is adjacent to the first through hole 34. The protrusion 464 passes through the first through hole 34 to lock onto the locking portion 30. The elastic buckle 46 further includes a connecting plate 466 extending from the end of the main body 42. The connecting plate 466 connects the base plate 462 and the main body 42. The pressing element 48 is attached to the connecting plate 466 and is parallel to the base plate 462. The end wall 24 further defines a second through hole 36. The pressing element 48 passes through the second through hole 36 to be located at a side of the end wall 24 away from the main body 42.

The hard disk mounting device 100 further includes a mounting element 66, a shaft 68, and a torsion spring 70. The mounting element 66 is mounted to the end wall 24. The mounting element 66 includes two mount walls 66a perpendicular to the end wall 24. Each mount wall 66a defines a third through hole 65. The two third through holes 65 have a same axis which is perpendicular to a sliding direction of the hard disk 40. The axis is further parallel to the end wall 24. A accommodating space 72 is defined between the two mount walls 66a and is in air communication with the first through hole 34. The rotatable element 60 is received in the accommodating space 72. The rotatable element 60 defines a shaft hole 74 thereon, and the shaft hole 74 is aligned with the two third through holes 65. The shaft 68 is fixed in the shaft hole 74 and the two third through holes 65, subsequently, the rotatable element 60 is rotated with the shaft 68. The first rotatable portion 62 and the second rotatable portion 64 are arranged on opposite sides of the rotatable element 60 so as to press the elastic buckle 46 and the pressing element 48. The torsion spring 70 is sleeved on the shaft 68 and abuts against the rotatable element 60, thus when the hard disk 40 is slided away from the end wall 24 and the external force on the rotatable element 60 is released, the torsion spring 70 resets the rotatable element 60.

The main body 42 includes a socket 43 facing the end wall 24. The hard disk mounting device 100 further includes a connector 80 mounted to the end wall 24. The connector 80 is mounted to the end wall 24 by screws. The connector 80 includes a number of pins 82. The end wall 24 defines a gap 32 thereon. The pins 82 pass through the gap 32 and are located near a side of the end wall 24 adjacent to the main body 42. Then the elastic buckle 46 can lock to the locking portion 30, the pins 82 are received in the socket 43, and the connector 80 is electrically connect to the hard disk 40. When the hard disk 40 is slided away from the end wall 24, the pins 82 are removed from the socket 43.

The embodiments shown and described above are only examples. Even though numerous descriptions and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims.

What is claimed is:

1. A hard disk mounting device comprising:
    a frame defining a receiving space, the frame comprising an end wall;
    a hard disk slidably received in the receiving space, the hard disk comprising a main body for storing data and a fastening element mounted to an end of the main body, and the hard disk slidably attached to the end wall to lock the fastening element to the end wall; and
    a rotatable element rotatably attached to the end wall, the rotatable element rotated to a preset position to press against the fastening element, unlock the fastening element, and the hard disk slidably detached from the end wall;
    wherein the fastening element comprises an elastic buckle and a pressing element, the elastic buckle can be locked to the end wall; wherein the rotatable element comprises a first rotatable portion and a second rotatable portion; wherein when the elastic buckle is locked to the end wall, the first rotatable portion is positioned below the elastic buckle; wherein the first portion can be rotated to abut and deform the elastic buckle such that the elastic buckle unlocks from the end wall; and wherein when the elastic buckle is unlocked from the end wall, the second portion presses against the pressing element and the hard disk is slidably detached from the end wall.

2. The hard disk mounting device as claimed in claim 1 wherein the end wall comprises a locking portion perpendicularly extends from a side of the end wall away from the hard disk, the end wall defines a first through hole thereon; wherein the frame further comprises a bottom wall perpendicular to the end wall; and wherein the elastic buckle comprises a protrusion extending toward the bottom wall, the protrusion passes through the first through hole and locks to the locking portion.

3. The hard disk mounting device as claimed in claim 1, wherein the end wall defines a through hole thereon, the pressing element passes through the through hole to be located at the side of the end wall away from the hard disk.

4. The hard disk mounting device as claimed in claim 1, wherein the hard disk mounting device further comprises a mounting element and a shaft, the mounting element is mounted to the end wall, the mounting element defines two through holes thereon, and the two through holes have a same axis perpendicular to a sliding direction of the hard disk, the rotatable element defines a shaft hole thereon, the shaft hole is aligned with the two through holes, the shaft is fixed in the shaft hole and the two through hole, and the rotatable element is rotatable with the shaft.

5. The hard disk mounting device as claimed in claim 4, wherein the mounting element comprises two mount walls perpendicular to the end wall, an accommodating space is defined between the two mount walls, and the rotatable element is received in the accommodating space.

6. The hard disk mounting device as claimed in claim 4, wherein the hard disk mounting device further comprises a torsion spring; wherein the torsion spring sleeves on the shaft, abuts the rotatable element, and resets the rotatable element.

7. The hard disk mounting device as claimed in claim 4, wherein the axis is further parallel to the end wall.

8. The hard disk mounting device as claimed in claim 1, wherein the main body comprises a socket facing the end wall, the hard disk mounting device further comprises a connector mounted to the end wall, the connector comprises a plurality of pins; and wherein when the fastening element is locked to the end wall, the pins are received in the socket to electrically connect the connector to the hard disk.

9. The hard disk mounting device as claimed in claim 8, wherein the end wall defines a gap, and the pins pass through the gap to be located a side of the end wall adjacent to main body.

10. A hard disk mounting device comprising:
    a frame comprising an end wall and two sidewalls, the two sidewalls parallel to each other, the end wall perpendicularly positioned between the two sidewalls;
    a hard disk positioned between the two sidewalls and being slidable along the sidewalls, the hard disk comprising a main body for storing data and a fastening element mounted to an end of the main body, and the hard disk slidably attached to the end wall to lock the fastening element to the end wall; and
    a rotatable element rotatably attached to the end wall, the rotatable element rotated from a first position to a second position to abut the fastening element and unlock the fastening element, and the hard disk slidably detached from the end wall;
    wherein the fastening element comprises an elastic buckle and a pressing element, the elastic buckle can be locked to the frame, the rotatable element comprises a first rotatable portion and a second rotatable portion; wherein when the elastic buckle is locked to the frame, the first rotatable portion is positioned below the elastic buckle; wherein the first portion can be rotated to abut and deform the elastic buckle such that the elastic buckle unlocks from the frame; and wherein when the elastic buckle is unlocked from the frame, the second portion presses against the pressing element and the hard disk is slidably detached from the end wall.

11. The hard disk mounting device as claimed in claim 10, wherein the end wall comprises a locking portion perpendicularly extends from a side of the end wall away from the hard disk, the end wall defines a through hole thereon; wherein the frame further comprises a bottom wall, the end wall perpendicularly holds on the bottom wall; and wherein the elastic buckle comprises a protrusion extending toward the bottom wall, the protrusion passes through the through hole and locks to the locking portion.

12. The hard disk mounting device as claimed in claim 10, wherein the end wall defines a through hole thereon, the pressing element passes through the through hole to be located at the side of the end wall away from the hard disk.

13. The hard disk mounting device as claimed in claim 10, wherein the hard disk mounting device further comprises a mounting element and a shaft, the mounting element is mounted to the end wall, the mounting element defines two through holes thereon, and the two through holes have a same axis perpendicular to a sliding direction of the hard disk, the rotatable element defines a shaft hole thereon, the shaft through hole is aligned with the two through holes, the shaft is fixed in the shaft hole and the two through holes, and the rotatable element is rotatable with the shaft.

14. The hard disk mounting device as claimed in claim 13, wherein the mounting element comprises two mount walls perpendicular to the end wall, an accommodating space is defined between the two mount walls, and the rotatable element is received in the accommodating space.

15. The hard disk mounting device as claimed in claim 13, wherein the hard disk mounting device further comprises a torsion spring; wherein the torsion spring sleeves on the shaft, abuts the rotatable element, and resets the rotatable element.

16. The hard disk mounting device as claimed in claim 13, wherein the axis is further parallel to the end wall.

17. The hard disk mounting device as claimed in claim 10, wherein the main body defines a socket facing the end wall, the hard disk mounting device further comprises a connector mounted to the end wall, the connector comprises a plurality of pins; and wherein when the fastening element is locked to the end wall, the pins are received in the socket to electrically connect the connector to the hard disk.

18. The hard disk mounting device as claimed in claim 17, wherein the end wall defines a gap, and the pins pass through the gap to be located a side of the end wall adjacent to main body.

\* \* \* \* \*